United States Patent
Murasawa

(10) Patent No.: US 8,606,324 B2
(45) Date of Patent: Dec. 10, 2013

(54) CELL IDENTIFIER DECIDING METHOD, RADIO BASE STATION AND RADIO COMMUNICATION SYSTEM

(75) Inventor: Shunichi Murasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 24 days.

(21) Appl. No.: 13/176,179

(22) Filed: Jul. 5, 2011

(65) Prior Publication Data

US 2012/0009957 A1 Jan. 12, 2012

(30) Foreign Application Priority Data

Jul. 9, 2010 (JP) .................................. 2010-156972

(51) Int. Cl.
*H04M 1/00* (2006.01)

(52) U.S. Cl.
USPC ............................. 455/561; 455/453; 455/560

(58) Field of Classification Search
USPC ......................................... 455/453, 561, 560
See application file for complete search history.

(56) References Cited

U.S. PATENT DOCUMENTS 8,406,782 B2 * 3/2013 Horneman et al. ......... 455/452.2
2009/0047956 A1 * 2/2009 Moe et al. ..................... 455/436

FOREIGN PATENT DOCUMENTS

JP 2008-199223 8/2008

OTHER PUBLICATIONS

3GPP, "3rd Generation Partnership Project; Technical Specification Group Radio Access Network; Evolved Universal Terrestrial Radio Access Network (E-UTRAN); X2 application protocol (X2AP) (Release 9)", 3GPP TS 36.423 V9.1.0 (Dec. 2009).

* cited by examiner

*Primary Examiner* — Vladimir Magloire
(74) *Attorney, Agent, or Firm* — Myers Wolin, LLC

(57) ABSTRACT

A cell identifier deciding method includes: judging whether identification of cell identifiers allocated to cells covered by a plurality of radio base stations is allowed among the plurality of radio base stations; and changing the cell identifier of a radio base station which is relatively low in processing load imposed on changing of its cell identifier in the plurality of radio base stations, in a case that it is judged that identification of the cell identifiers is not allowed.

9 Claims, 13 Drawing Sheets

FIG. 7

| | | PCI | ECGI |
|---|---|---|---|
| cell information #1 of its own | cell information of its own | 5 | 100 |
| | neighboring cell information #1 | 6 | ... |
| | neighboring cell information #2 | 7 | ... |
| | neighboring cell information #3 | 153 | ... |
| | neighboring cell information #4 | 100a | 200 |
| cell information #2 of its own | cell information of its own | 6 | ... |
| | neighboring cell information #1 | 5 | ... |
| | neighboring cell information #2 | 7 | ... |
| | neighboring cell information #3 | 100a | 200 |
| cell information #3 of its own | cell information of its own | 7 | ... |
| | neighboring cell information #1 | 5 | ... |
| | neighboring cell information #2 | 6 | ... |
| | neighboring cell information #3 | 152 | ... |
| | neighboring cell information #4 | 153 | ... |

FIG. 9

| | | PCI | ECGI |
|---|---|---|---|
| cell information #1 of its own | cell information of its own | 100b | 300 |
| | neighboring cell information #1 | 103 | ... |
| | neighboring cell information #2 | 104 | ... |
| | neighboring cell information #3 | 153 | ... |
| | neighboring cell information #4 | 204 | ... |
| | neighboring cell information #5 | 5 | 100 |
| cell information #2 of its own | cell information of its own | 103 | ... |
| | neighboring cell information #1 | 100b | 300 |
| | neighboring cell information #2 | 104 | ... |
| | neighboring cell information #3 | 200 | ... |
| | neighboring cell information #4 | 204 | ... |
| cell information #3 of its own | cell information of its own | 104 | ... |
| | neighboring cell information #1 | 100b | 300 |
| | neighboring cell information #2 | 103 | ... |
| | neighboring cell information #3 | 150 | ... |
| | neighboring cell information #4 | 153 | ... |

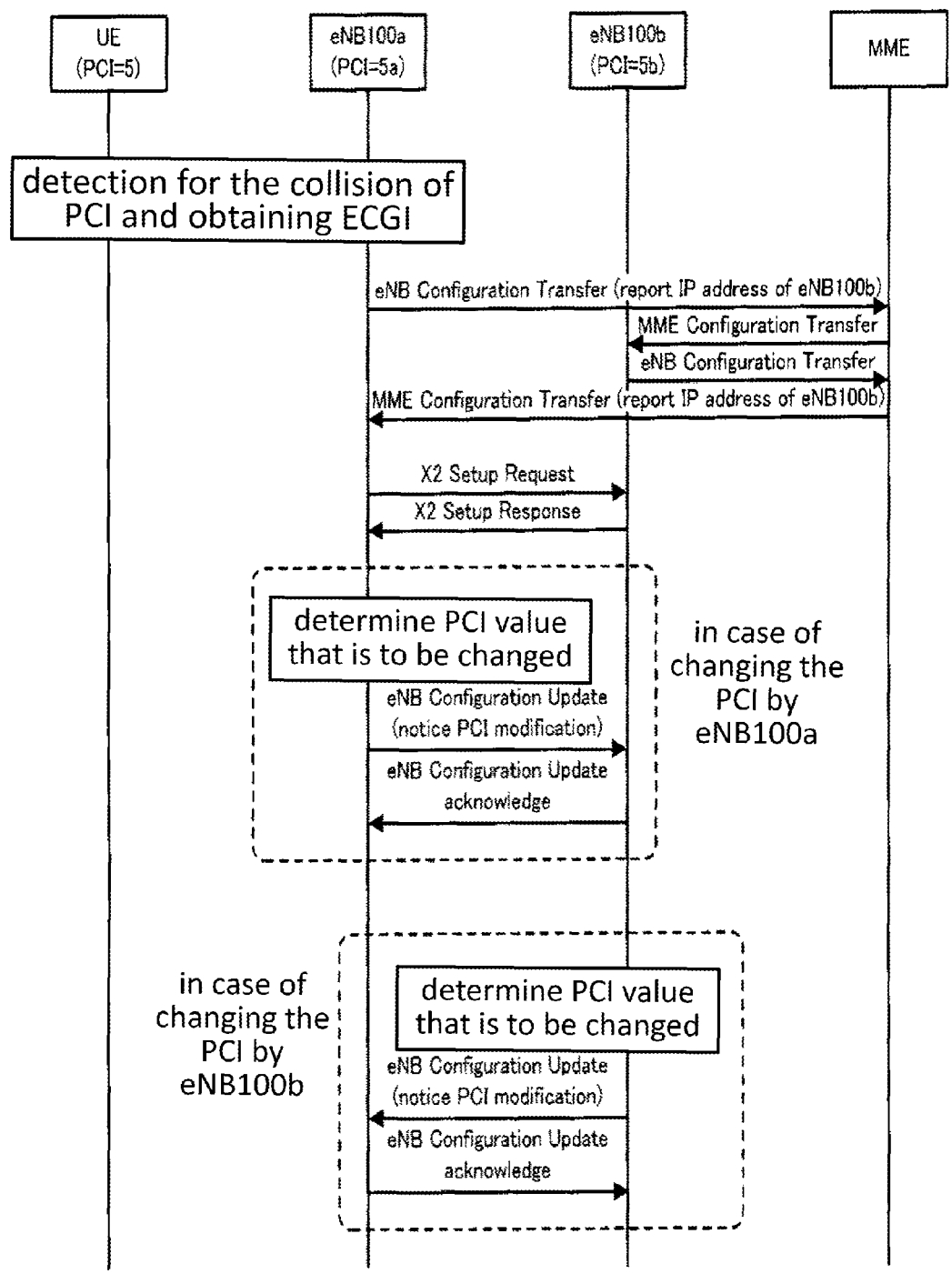

CELL IDENTIFIER DECIDING METHOD, RADIO BASE STATION AND RADIO COMMUNICATION SYSTEM

CROSS REFERENCE TO RELATED APPLICATION

This application is based upon and claims the benefit of priority from the prior Japanese Patent Application NO. 2010-156972 filed on Jul. 9, 2010, the entire contents of which are incorporated herein by reference.

FIELD

The embodiments discussed herein are related to a radio base station and a cell identifier deciding method used in the radio base station and the radio communication system.

BACKGROUND

In a radio communication system such as a cell phone system or the like, a radio base station (for example, an eNB: e NodeB) performs radio communication with a mobile terminal (for example, a UE: User Equipment) which is positioned in a cell that the radio base station contains. An inherent cell identifier (for example, a PCI: Physical Cell Identifier) that may not collide with (that is, may not overlap) those of neighboring cells is allocated to each cell that each radio base station contains such that each mobile terminal is allowed to identify each cell. For example, in the case that one cell identifier is allocated to one cell that one radio base station contains, another cell identifier which is different from one cell identifier is allocated to another cell that one radio base station or another radio base station contains and neighbors one cell.

In recent years, the proposal of SON (Self Organization Network) is being promoted aiming at cost reduction of a radio communication system maintaining operation including a cell identifier allocating operation. For example, as one of techniques of the SON that automatically constructs a neighbor relation between cells including the cell identifier allocating operation, ANR (Automatic Neighbor Relation) is proposed. In the ANR, an ECGI (Evolved Cell Global Identifier) corresponding to a cell identifier (PCI) concerned is notified from a mobile terminal to a radio base station utilizing "Measurement Report" that informs a radio base station of the cell identifier (PCI) that the mobile terminal has recognized. The radio base station that has received notice of the ECGI grasps the presence of an unknown cell or an unknown radio base station and constructs a neighbor relation with reference to both the ECGI and the PCI.

Japanese Laid-open Patent Publication No. 2008-199223 is one example of related art. 3GPP TS36. 423 v9. 1. 0 is another example of related art.

In the ANR, it is preconditioned that cell identifiers do not collide with one another among a plurality of neighboring cell. That is, in the ANR, it is preconditioned that unique cell identifiers are respectively allocated to a plurality of neighboring cells. However, it may sometimes occur that the cell identifiers collide with one another depending on an actual operation state of a radio communication system concerned. Collision of the cell identifiers may adversely affect automatic construction of the neighbor relation among the cells by the ANR.

Next, a case in which a new radio base station is to be installed in a blind zone which is present in an arbitrary area where an existing radio base station (or an existing cell) has already been installed will be studied by way of example. The existing radio base station may be possibly installed as a stand-alone radio base station that may not consider the uniqueness of each cell identifier. Therefore, a newly installed radio base station (or a cell that the newly installed radio base station contains) may possibly construct a neighbor relation with the existing radio base station (or the existing cell) that contains a cell to which the same cell identifier as that of the cell in which the newly installed radio base station is allocated. In the case that the cell identifiers collide with each other, both the radio base stations the cell identifiers of which collide with each other may possibly change their cell identifiers because appropriate procedures are not defined by the ANR. Or, the cell identifier in one radio base station which is larger than the other radio base station in processing load imposed on changing of its cell identifier in the radio base stations the cell identifiers of which collide with each other may possibly be changed.

Or, such a situation may be also estimated that although two existing radio base stations have not been in a neighbor relation so far owing to presence of an obstacle (a shield) such as a building or the like between them, these two existing radio base stations are newly brought into the neighbor relation owing to removal of the obstacle between them. In the above mentioned situation, in the case that the cell identifiers collide with each other between the two existing radio base stations, it may be difficult to distinguish these two radio base stations from each other using cell identifiers allocated thereto. Accordingly, in the ANR, it may be difficult to automatically construct the neighbor relation of cells between two radio base stations.

SUMMARY

According to one aspect of the embodiments, there is provided a cell identifier deciding method including: judging whether identification of cell identifiers allocated to cells covered by a plurality of radio base stations is allowed among the plurality of radio base stations; and changing the cell identifier of a radio base station which is relatively low in processing load imposed on changing of its cell identifier in the plurality of radio base stations, in a case that it is judged that identification of the cell identifiers is not allowed.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 7 is a data structure diagram illustrating an example of cell information to be exchanged between eNBs as a result of the ANR process which is performed by being triggered by detection of the presence of the other eNB using one eNB;

FIG. 9 is a data structure diagram illustrating an example of cell information to be exchanged between eNBs as a result of the ANR process which is performed by being triggered by detection of the presence of the other eNB using one eNB;

FIG. 12 is a sequence diagram illustrating an example of a flow of the second process example that one eNB performs.

DESCRIPTION OF EMBODIMENTS

Next, preferred embodiments of the present invention will be described with reference to the accompanying drawings.

(1) Configuration of Radio Communication System

Figure 1:
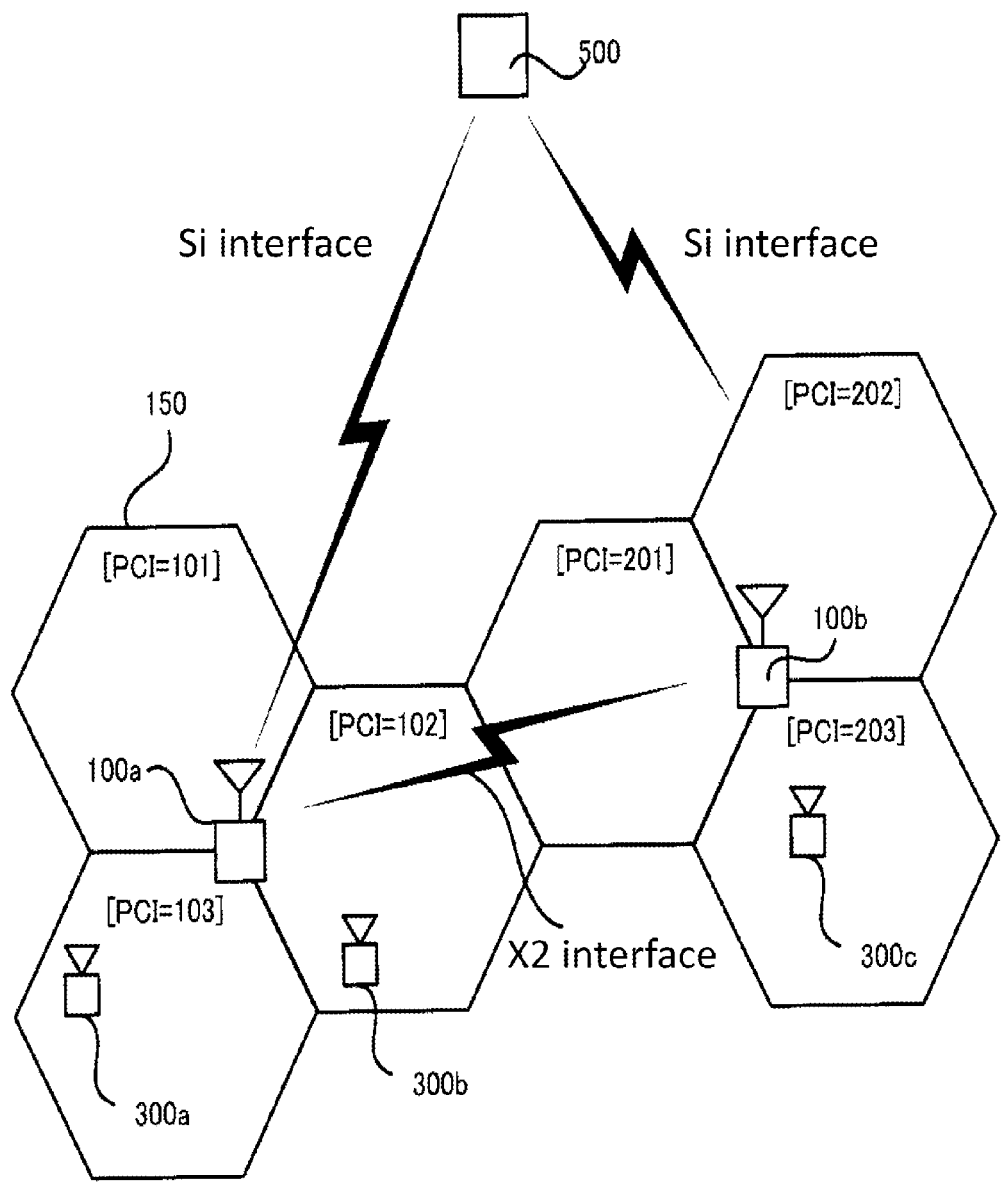
FIG. 1 is a block diagram illustrating an example of a configuration of a radio communication system according to an embodiment.

A configuration of a radio communication system 1 according to an embodiment will be described with reference to FIG. 1. FIG. 1 is a block diagram illustrating an example of the configuration of the radio communication system 1 according to the embodiment.

As illustrated in FIG. 1, the radio communication system 1 according to the embodiment includes an eNB (e NodeB) 100a, an eNB 100b, a UE (User Equipment) 300a, a UE 300b, a UE 300c, and an MME (Mobility Management Entity) 500. Incidentally, the number of eNBs and the number of MMES illustrated in FIG. 1 are mere examples and each of the number of eNBs and the number of MMES is not limited to the number illustrated in FIG. 1. In the following, in the case that description is made with no discrimination of the eNB 100a from the eNB 100b for the convenience of explanation, description will be made simply by denoting it as the "eNB 100". Likewise, in the case that description is made with no discrimination the UE 300a, the UE 300b and the UE 300c from one another, description will be made simply by denoting it as the "UE 300".

The eNB 100 is a radio base station that contains a plurality of cells 150 (in other words, a plurality of sectors). Each inherent PCI (Physical Cell Identifier) for identifying each cell 150 is allocated to each cell 150. For example, in the example illustrated in FIG. 1, the eNB 100a contains a cell 150 to which "101" is allocated as the PCI, a cell 150 to which "102" is allocated as the PCI, and a cell 150 to which "103" is allocated as the PCI. Likewise, in the example illustrated in FIG. 1, the eNB 100b contains a cell 150 to which "201" is allocated as the PCI, a cell 150 to which "202" is allocated as the PCI, and a cell 150 to which "203" is allocated as the PCI. Incidentally, in the following explanation, description will be made by denoting the "cell 150 to which "XXX" is allocated as the PCI" as the "cell 150 (PCI=XXX)" for the convenience of explanation. The eNB 100 performs radio communication with each UE 300 positioned in the cell 150 that it contains. That is, the eNB 100 establishes a communication connection with each UE 300 positioned in the cell 150 that it contains and sends data to the UE 100 and receives data from the UE 300. In addition, the cells 150 that each eNB contains may be configured such that a part of one cell 150 overlaps a part or the entire of another cell 150, or may be configured such that the entire of one cell 150 does not overlap another cell 150.

One eNB 100 communicates with the other eNB 100 via an X2 interface which is established between it and the other eNB 100. In the example illustrated in FIG. 1, the eNB 100a communicates with the eNB 100b via the X2 interface established between it and the eNB 100b. Each of the eNBs 00a and 100b communicates with the MME 500 via an S1 interface which is established between it and the MME 500.

The UE 300 is a mobile terminal that establishes a communication connection with one eNB 100 that contains the cell 150 within which the UE 300 is positioned and sends data to the eNB 100 and receives data from it. The UE 300 is allowed to utilize various services and/or applications (for example, a mailing service, a voice talking service, a WEB browsing service, a packet communication service and the like) via the eNB 100 (in addition, a host station or the like such as the MME 500 or the like which is connected on the upper side of the eNB 100). As examples of the above mentioned UE 300, a cell phone, a PDA (Personal Digital Assistant), various pieces of information equipment having other radio communication functions and the like may be given. That is, as the radio communication system 1 according to the embodiment, for example, a cell phone system, a mobile communication system and the like may be given by way of example.

The MME 500 is a host station that performs setting and releasing of a session (connection) for packet communication, management of mobility of the UE 300 and control of handover.

Incidentally, although the eNB 100 that contains a plurality of cells 150 is illustrated in the above mentioned description, an eNB 100 that contains a single cell 150 may be installed.

(2) Configuration of eNB

Figure 2:
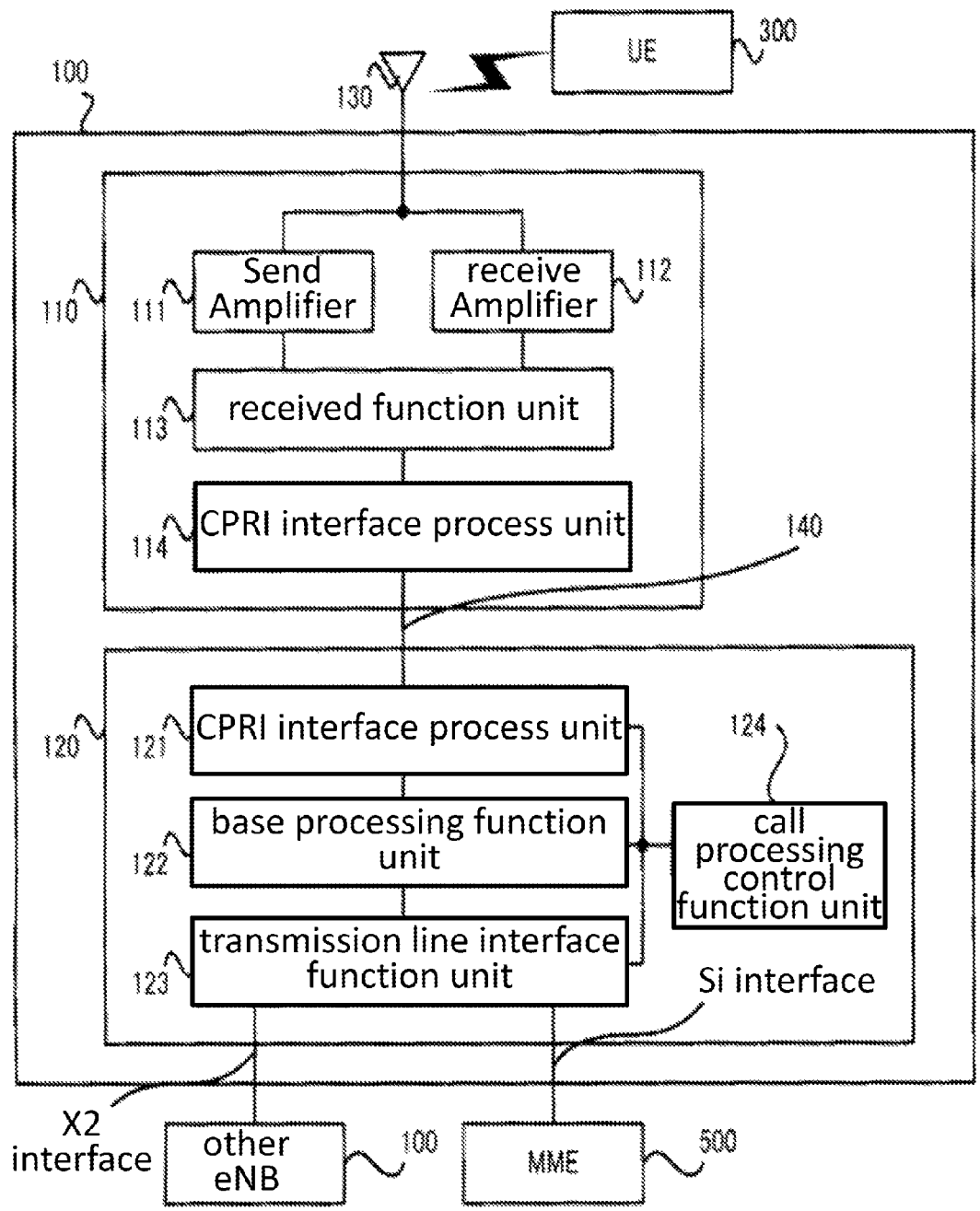
FIG. 2 is a block diagram illustrating an example of a functional block of an eNB according to the embodiment.
Figure 3:
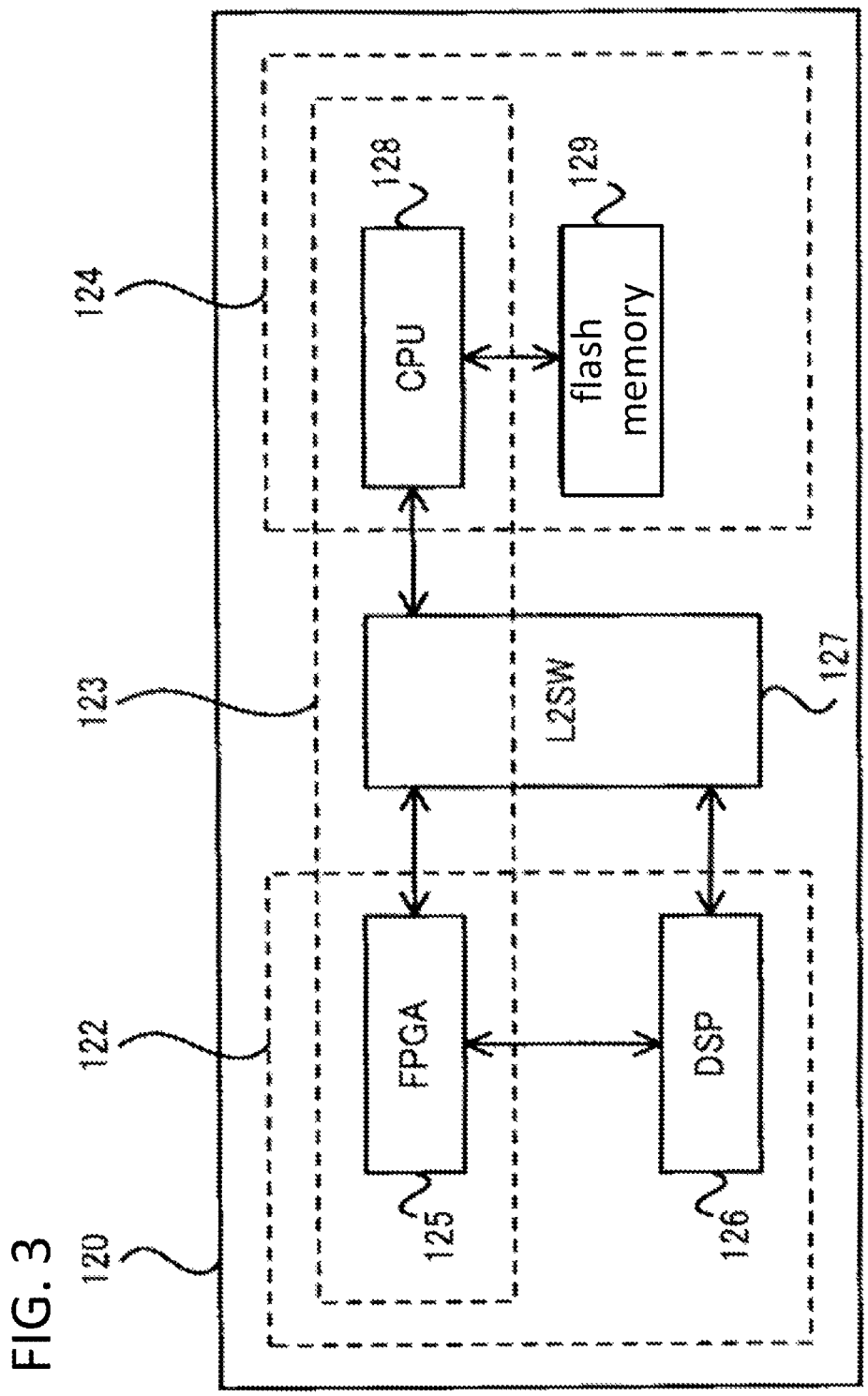
FIG. 3 is a block diagram illustrating an example of a hardware block of the eNB according to the embodiment.

The configuration of each eNB 100 will be described with reference to FIG. 2 and FIG. 3. FIG. 2 is a block diagram illustrating an example of a functional block of the eNB 100. FIG. 3 is a block diagram illustrating an example of a hardware block of each eNB 100.

As illustrated in FIG. 2, each eNB 100 includes an RRH (Remote Radio Head) 110, a BBU (Base Band Unit) 120, and an antenna 130. The RRH 110 and the BBU 120 are allowed to mutually send and receive information via a CPRI (Common Public Radio Interface) link 140 including a communication line (for example, an optical fiber or the like) having a transmission distance of a predetermined length (for example, from several m to several tens km).

The RRH 110 is a radio device performing radio sending and receiving processes or the like and includes a send amplifier 111, a receive amplifier 112, a radio sending and receiving function unit 113, and a CPRI interface process unit 114.

The send amplifier 111 amplifies a down-link signal which is sent from each eNB 100 to the UE 300. The amplified down-link signal is sent to the UE 300 via the antenna 130.

The receive amplifier 112 amplifies an up-link signal which is received via the antenna 130. The amplified up-link signal is transferred to the radio sending and receiving function unit 113.

The radio sending and receiving function unit 113 performs a radio sending process on a baseband signal which is sent from the BBU 120 via the CPRI interface process unit 114 in sending a down-link signal. The baseband signal (that is, the down-link signal) so subjected to the radio sending process is transferred to the send amplifier 111. The radio sending and receiving function unit 113 performs a radio receiving process on an up-link signal which is transferred from the receive amplifier 112 in receiving the up-link signal. The up-link signal (that is, the baseband signal) so subjected to the radio receiving process is transferred to the CPRI interface process unit 114.

The CPRI interface process unit 114 operates to send and receive signals between the RRH 110 and the BBU 120 via the CPRI link 140. For example, the CPRI interface process unit 114 acquires the baseband signal which is sent from the BBU 120 via the CPRI link 140 and transfers the acquired baseband signal to the radio sending and receiving function unit 113 in sending the down-link signal. For example, the CPRI interface process unit 114 acquires the baseband signal which is transferred from the radio sending and receiving function unit 113 and sends the BBU 120 the acquired baseband signal via the CPRI ink 140 in receiving the up-link signal.

The BBU 120 is a radio controller that performs baseband processing or the like and includes a CPRI interface process unit 121, a baseband processing function unit 122, a transmission line interface function unit 123, and a call processing control function unit 124 which is an example of the "judging means" and "changing means".

The CPRI interface process unit 121 operates to send and receive signals between the RRH 110 and the BBU 120 via the CPRI link 140. For example, the CPRI interface process unit 121 acquires the baseband signal which is transferred from the baseband processing function unit 122 and sends the RRH 110 the acquired baseband signal via the CPRI link 140 in sending the down-link signal. For example, the CPRI interface process unit 121 acquires the baseband signal which is sent from the RRH 110 via the CPRI link 140 and transfers the acquired baseband signal to the baseband processing function unit 122 in receiving the up-link signal.

The baseband processing function unit 122 performs baseband processing on data which is to be sent to the UE 300 in sending the down-link signal. The data (that is, the baseband signal) so subjected to the baseband processing is transferred to the CPRI interface function unit 121. The baseband processing function unit 122 performs the baseband processing on the baseband signal which is transferred from the CPRI interface process unit 121 in receiving the up-link signal. The baseband signal (that is, the data) so subjected to the baseband processing is transferred to the transmission line interface function unit 124.

The transmission line interface function unit 123 operates to send and receive signals between the eNB 100 and the MME 500 via the S1 interface. In addition, the transmission line interface function unit 123 also operates to send and receive signals between one eNB 100 and another eNB 100 via the X2 interface.

The call processing control function unit 124 processes call processing signals included in signals which are sent and received between the eNB 100 concerned and the UE 300 concerned, signals which are sent and received between the eNB 100 concerned and the MME 500, and signals which are sent and received between one eNB 100 and another eNB 100.

As illustrated in the example in FIG. 3, the eNB 100 includes an FPGA (Field Programmable Gate Array) 125, a DSP (Digital Signal Processor) 126, an L2SW (Layer 2 Switch) 127, a CPU 128 that controls the operations of the entire eNB 100, and a flash memory 129 viewing from the hardware configuration. The FPGA 125 is an integrated process circuit including a rewritable logical circuit and is allowed to appropriately define or design the logical circuit so as to perform processes conforming to the specification of the eNB 100 concerned. The DSP 126 performs various processes relating to digital signals.

The L2SW 127 controls signal transmission among the FPGA 125, the DSP 126 and the CPU 128. The CPU 128 is a control circuit that operates on the basis of predetermined firmware or the like and controls the operations of the entire eNB 100. The flash memory 129 temporarily stores data which is used within the eNB 100 and stores a program (that is, firmware) used to perform the operations as the eNB 100. The FPGA 125 and the DSP 126 correspond to the above mentioned baseband processing function unit 122. The FPGA 125, the L2SW 127 and the CPU 128 correspond to the above mentioned transmission line interface function unit 123. The CPU 128 and the flash memory 129 correspond to the above mentioned call processing control function unit 124.

(3) First Process Example

Figure 4:
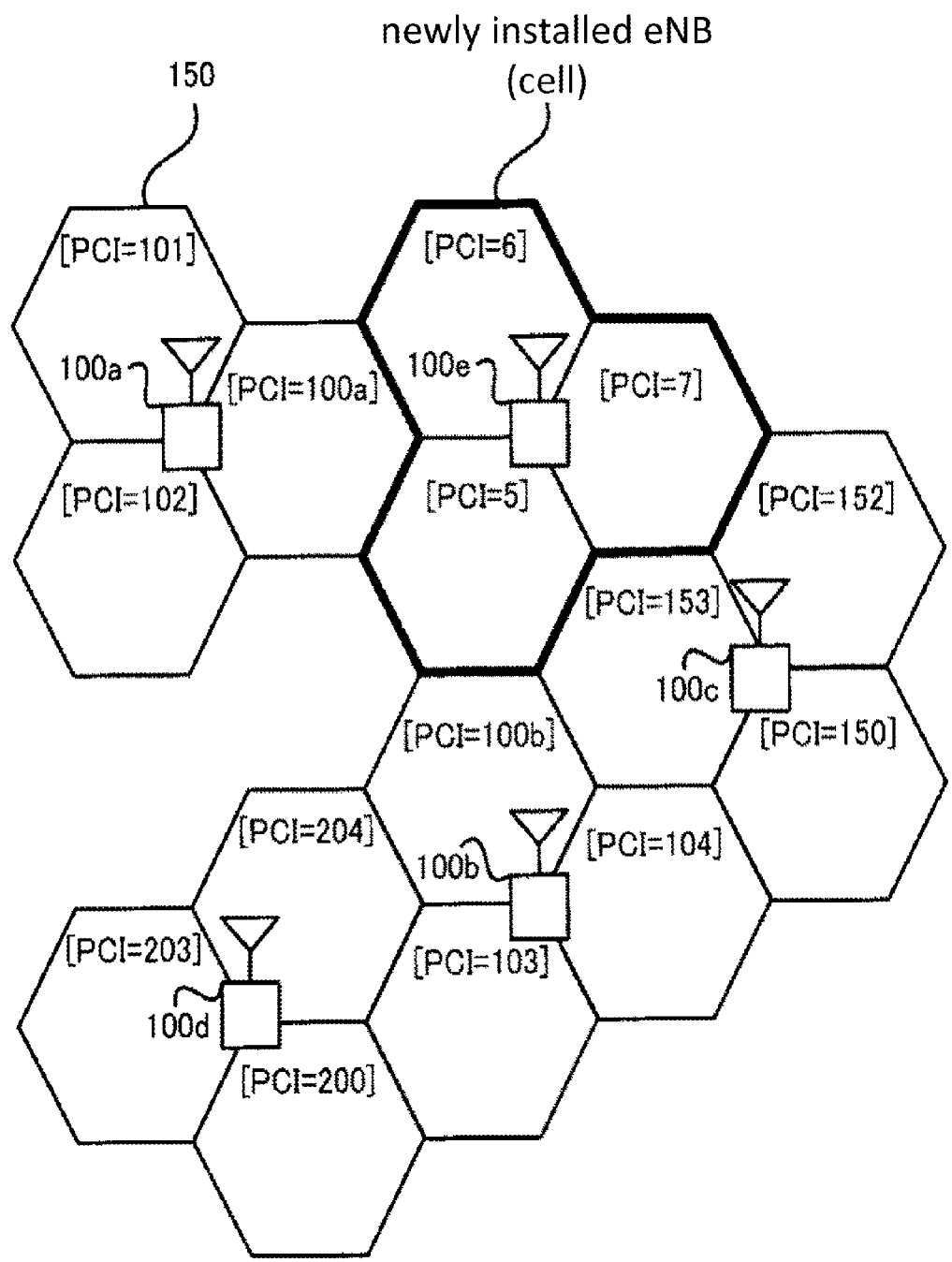
FIG. 4 is a diagram illustrating an example of a state of cells when the eNB performs a first process example.
Figure 5:
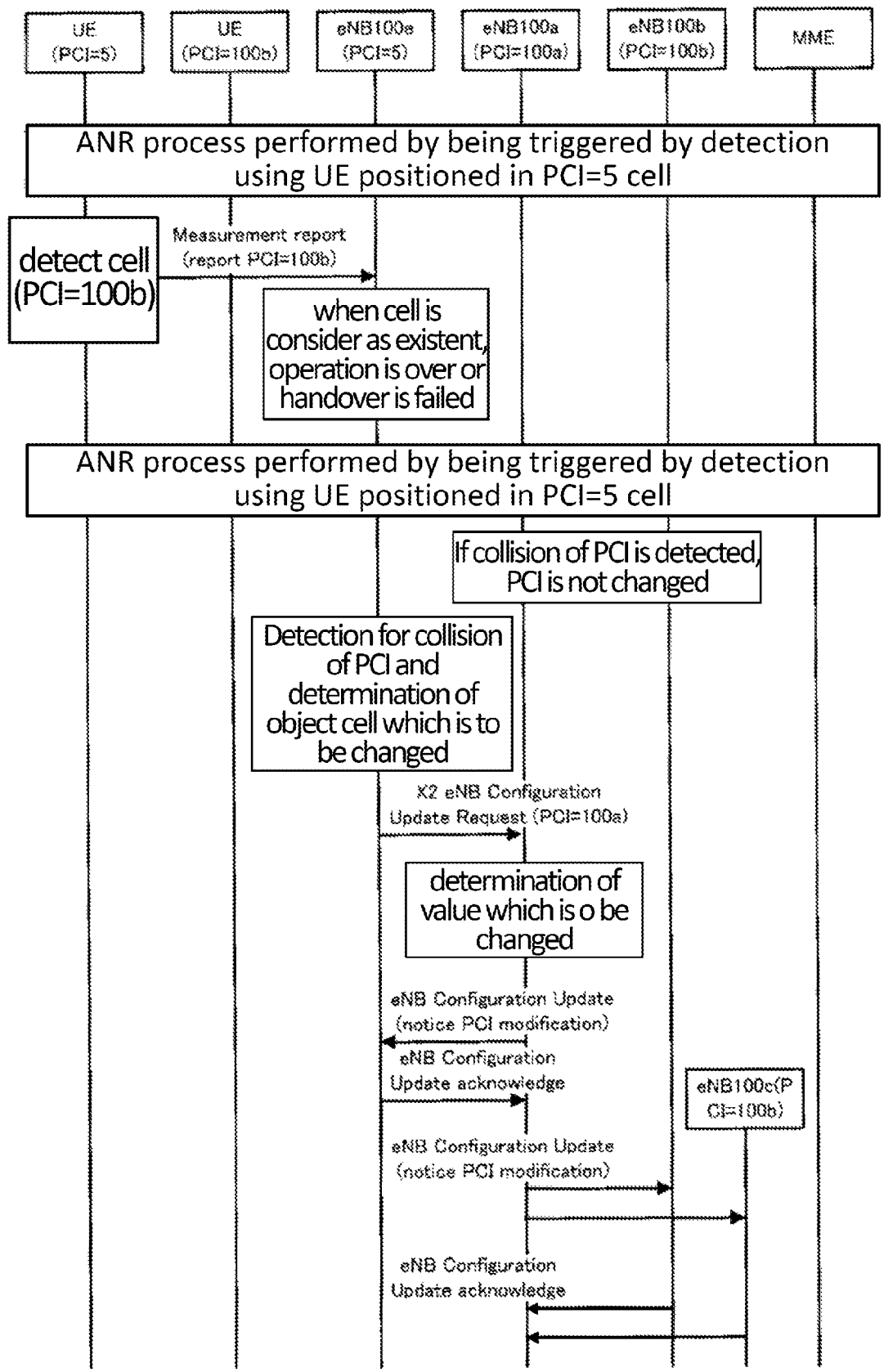
FIG. 5 is a sequence diagram illustrating an example of a flow of the first process example that the eNB performs.

A first process example which is performed using an eNB 100 will be described with reference to FIG. 4 and FIG. 5. FIG. 4 is a diagram illustrating an example of a state of the cells 150 when the eNB 100 performs the first process example. FIG. 5 is a sequence diagram illustrating an example of a flow of the first process example that the eNB 100 performs.

As illustrated in the example in FIG. 4, the first process example is a process which is performed in the case that a new eNB 100 is to be installed in a blind zone (that is, a zone in which any cell 150 is not installed) in an area where an existing eNB 100 (or an existing cell 150) has already been installed.

In the following, the first process example will be described with reference to a specific example in which an eNB 100e that contains a cell 150 (PCI=5), a cell 150 (PCI=6) and a cell 150 (PCI=7) is to be newly installed in a blind zone between the eNB 100a that contains the cell 150 (PCI=101), the cell 150 (PCI=102) and the cell 150 (PCI=100, hereinafter, referred to as "100 (a)" for expedient identification) and the eNB 100b that contains the cell 150 (PCI=103), the cell 150 (PCI=104) and the cell 150 (PCI=100, hereinafter, referred to as "100 (b)" for expedient identification) as illustrated in the example in FIG. 4.

That is, the first process example will be described with reference to the specific example in which collision of the PCIs is actualized between the cell 150 (PCI=100 (a)) and the cell 150 (PCI=100 (b)) owing to new installation of the eNB 100e. In other words, the first process example will be described with reference to the specific example in which it becomes difficult to identify (or distinguish from each other) the PCIs between the cell 150 (PCI=100 (a)) and the cell 150 (PCI=100 (b)) owing to new installation of the eNB 100e. Incidentally, the eNB 100b neighbors an eNB 100c that contains a cell 150 (PCI=150), a cell 150 (PCI=152) and a cell 150 (PCI=153). The eNB 100b also neighbors an eNB 100d that contains a cell 150 (PCI=200), a cell 150 (PCI=203) and a cell 150 (PCI=204)

As illustrated in the example in FIG. 5, after the eNB 100e has been newly installed, the UE 300 moves into the cell 150 that the newly installed eNB 100e contains. For example, it is supposed that the UE 300 has moved into the cell 150 (PCI=5) that the eNB 100e contains.

In the above mentioned situation, the UE 300 receives both notice information which is sent from the eNB 100e that contains the cell 150 (PCI=5) in which the UE 300 is positioned and notice information which is sent from another eNB 100 that contains another neighboring cell 150. Incidentally, the notice information includes the PCI (in addition, the ECGI (Evolved Cell Global Identifier)) of the cell 150 that the eNB 100 contains. Therefore, the UE 300 is allowed to detect the presence of another cell 150 that neighbors the cell 150 in which the UE 300 is currently positioned by receiving the notice information.

For example, as illustrated in the example in FIG. 5, the UE 300 receives notice information which is sent from the eNB 100a that contains the cell 150 (PCI=100 (a)) that neighbors the cell 150 (PCI=5). The UE 300 that has received the notice information sends the eNB 100a that contains the cell 150 (PCI=5) in which the UE 300 is positioned a "Measurement Report" message including the PCI (=100(a)) included in the notice information. As a result, the eNB 100e detects the presence of another eNB 100, that is, the eNB 100a that contains the cell 150 (PCI=100 (a)). Then the ANR (Automatic Neighbor Relation) process which is defined by 3GPP TS36. 300 "Overall description" is performed using the eNB 100e, the eNB100a, the UE 300 and the MME 500 by being triggered by detection of the presence of the eNB 100a.

Figure 6:
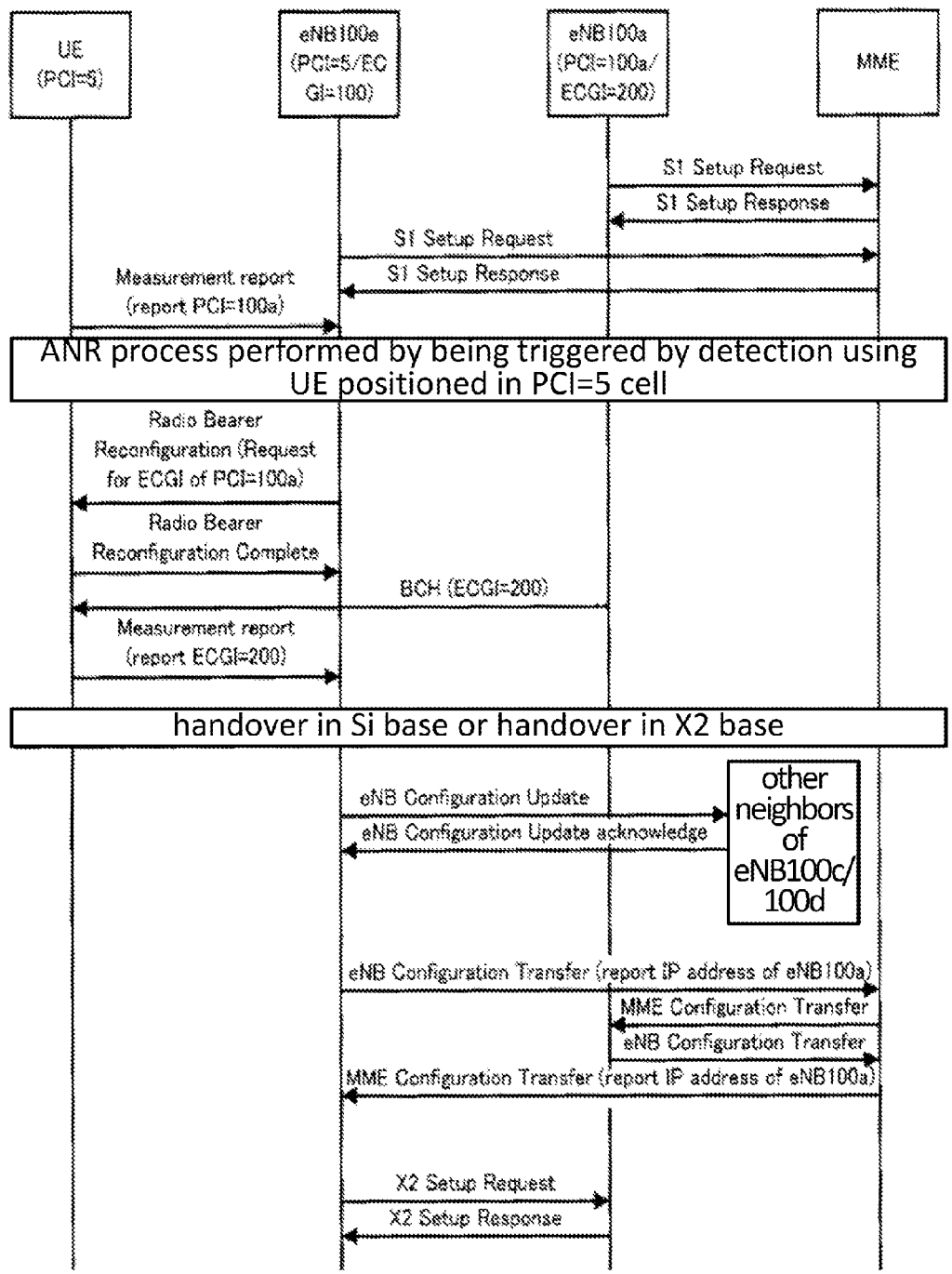
FIG. 6 is a sequence diagram illustrating an example of a flow of an ANR process which is performed by being triggered by detection of the presence of the other eNB using one eNB.

Next, the ANR process which is performed by being triggered by detection of the presence of another eNB 100, that is, the eNB 100a that contains the cell 150 (PCI=100 (a) using the eNB 100e that contains the cell 150 (PCI=5) will be described with reference to FIG. 6 and FIG. 7. FIG. 6 is a sequence diagram illustrating an example of a flow of the ANR process which is performed by being triggered by detection of the presence of the eNB 100a using the eNB 100e. FIG. 7 is a data structure diagram illustrating an example of cell information which is exchanged between the eNBs 100 by the ANR process which is performed by being triggered by detection of the presence of the eNB 100a using the eNB 100e.

As illustrated in the example in FIG. 6, a connection is established between the eNB 100 and the MME 500 included in the radio communication system 1 via the S1 interface before the ANR process is performed. Specifically, for example, an "S1 Setup Request" message that requests to establish the connection is sent from the eNB 100a to the MME 500 under the operation of the call processing control function unit 124. The MME 500 that has received the "S1 Setup Request" message sends the eNB 100a an "S1 Setup Response" message that complies with establishment of the connection. Owing to the above mentioned operations, the connection is established between the eNB 100a and the MME 500 via the S1 interface. Likewise, a connection is also established between the eNB 100e and the MME 500 via the S1 interface in the same procedures as the above after the eNB 100e has been newly installed.

Then, the UE 300 receives notice information which is sent from the eNB 100a that contains the cell 150 (PCI=100 (a)) that neighbors the cell 150 (PCI=5). The UE 300 that has received the notice information sends the eNB 100e a "Measurement Report (report PCI=100 (a))" message that includes the PCI (=100 (a)) included in the notice information. As a result, the eNB 100e detects the presence of another eNB, that is, the eNB 100a that contains the cell 150 (PCI=100 (a)). Therefore, the ANR process is performed.

Specifically, the call processing control function unit 124 included in the eNB 100e sends the UE 300 a "Radio Bearer Reconfiguration (Request for ECGI of PCI=100(a))" message in order to acquire the ECGI of the newly detected eNB 100a. The UE 300 that has received the "Radio Bearer Reconfiguration (Request for ECGI of PCI=100 (a))" message sends the eNB 100e a "Radio Bearer Reconfiguration Complete" message indicating receipt of the message.

The UE 300 extracts the ECGI from the notice information which is sent from the eNB 100a that contains the cell 150 (PCI=100 (a)) that neighbors the cell 150 (PCI=5). After extraction of the ECGI, the UE 300 sends the eNB 100e a "Measurement Report (report ECGI=200)" message including the ECGI (=200) included in the notice information.

The call processing control function unit 124 included in the eNB 100e that has received the "Measurement Report (report ECGI=200)" message including the ECGI judges whether the eNB 100a that contains the cell 150 (PCI=100 (a) & ECGI=200) is a newly installed eNB 100 or an existing eNB 100. In the case that the eNB 100a that contains the cell 150 (PCI=100 (a) & ECGI=200) is the newly installed eNB 100, the handover process is performed among the eNB 100e, the eNB 100a, the UE 300 and the MME 500 via the S1 interface. On the other hand, in the case that the eNB 100a that contains the cell 150 (PCI=100 (a) & ECGI=200) is the existing eNB 100, the handover process is performed among the eNB 100e, the eNB 100a, the UE 300 and the MME 500 via the X2 interface.

After the handover process has been performed, the call processing control function unit 124 included in the eNB 100e notifies another eNB 100, that is, the eNB 100c that neighbors the eNB 100e of cell information indicating the cell 150 that the eNB 100e contains and the neighboring cell which has been recognized by the ANR process which has been performed this time via the transmission line interface function unit 123. In the above mentioned situation, it is preconditioned that the newly installed eNB 100e has constructed in advance the neighbor relation with the eNB 100c by performing the ANR process or the like. Specifically, as illustrated in the example in FIG. 7, the eNB 100e notifies the eNB 100c of the cell information indicating the cell 150 (PCI=5 & ECGI=100), the cell 150 (PCI=6 & ECGI= . . . ), and the cell (PCI=7 & ECGI= . . . ) that the eNB 100a contains and the cell information of each cell that neighbors each cell that the eNB 100e contains. Notification of the cell information is performed by sending and receiving an "eNB Configuration Update" message and an "eNB Configuration Update acknowledge" message between them.

Then, the call processing control function unit 124 included in the eNB 100e sends the MME 500 an "eNB Configuration Transfer (report IP address of eNB 100a)" message. The MME 500 sends the eNB 100a an "MME Configuration Transfer" message. Then, the eNB 100a sends the MME 500 an "eNB Configuration Transfer" message. The MME 500 sends the eNB 100e an "MME Configuration Transfer (report IP address of eNB100a)" message. As a result, the eNB 100e acquires the IP address of the eNB 100a. The call processing control function unit 124 included in the eNB 100e establishes the 2 interface between the eNB 100e and the eNB 100a using the acquired IP address. The X2 interface is established by sending and receiving an "X2 Setup Request" message and an X2 Setup Response" message between them. Incidentally, in the case that the eNB 100 which has been detected by receiving the "Measurement Report" message is an existing eNB 100, acquisition of the IP address and establishment of the X2 interface may not be performed.

Again in the example illustrated in FIG. 5, the UE 300 also receives notice information which is sent from the eNB 100b that contains the cell 150 (PCI=100 (b)) that neighbors the cell 150 (PCI=5). The UE 300 that has received the notice information sends the eNB 100e that contains the cell 150 (PCI=5) in which the UE 300 is positioned a "Measurement Report" message including the PCI (=100 (b)) included in the notice information. However, the eNB 100e erroneously recognizes that the cell 150 (PCI=100 (b)) which has been notified by the "Measurement Report" message is the existing cell 150 (PCI=100 (a)). Thus, the ANR process is not performed even by receiving the "Measurement Report" message including the PCI (=100 (b)). Therefore, the process may be terminated or handover may not be normally performed.

Then, it is supposed that the UE 300 moves into the cell 150 (PCI=100 (b)) and receives notice information which is sent from the eNB 100e that contains the cell 150 (PCI=5) that neighbors the cell 150 (PCI=100 (b)). In the above mentioned case, the UE 300 sends the eNB 100b that contains the cell 150 (PCI=100 (b)) in which the UE 300 is positioned a "Measurement Report" message including the PCI (=5) included in the notice information. As a result, the eNB 100b detects presence of another eNB, that is, the eNB 100e that contains the cell (PCI=5). The ANR process is performed using the eNB 100b, eNB 100e, the UE 300 and the MME 500 by being triggered by detection of the presence of the eNB 100e.

Figure 8:
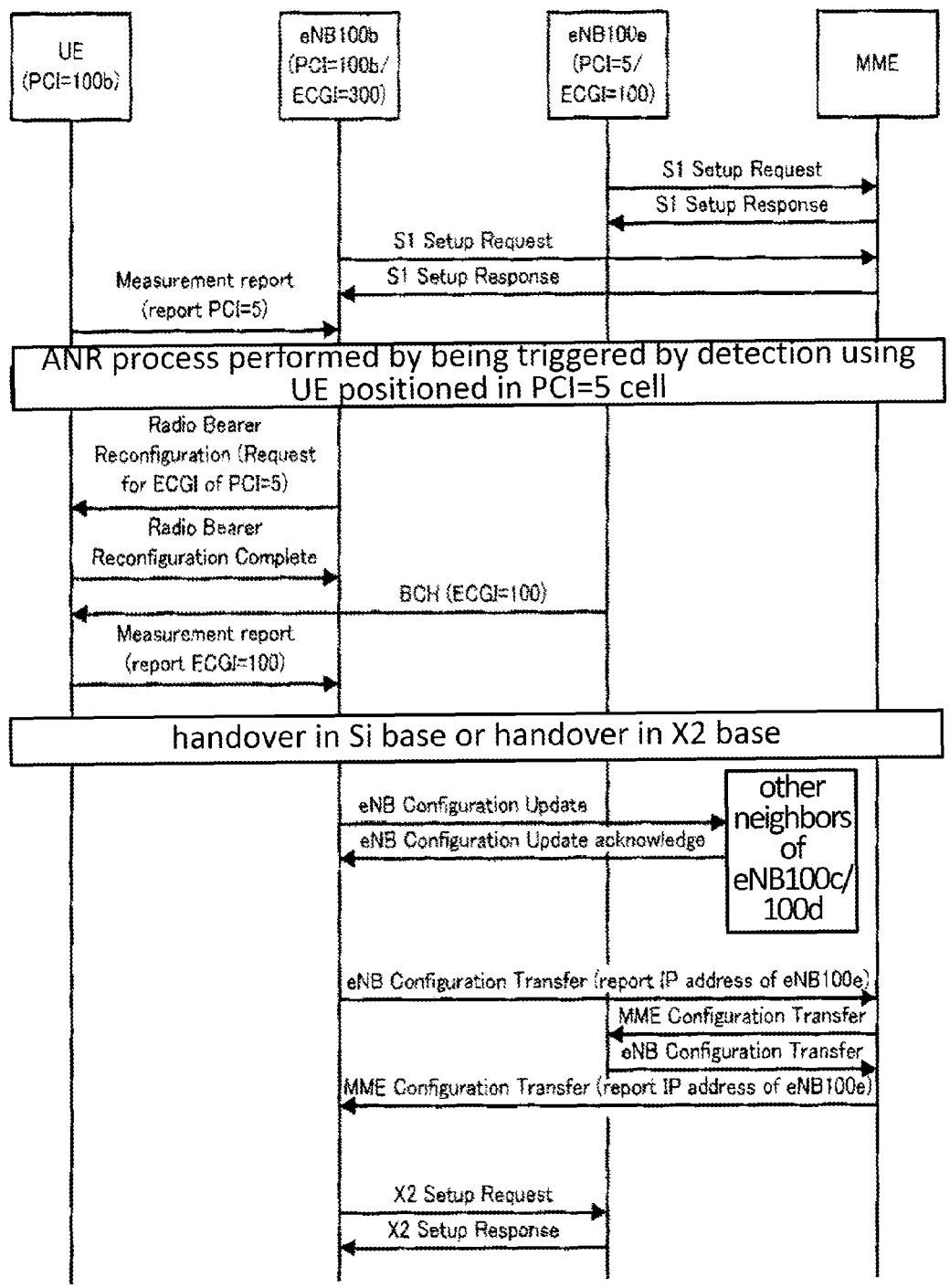
FIG. 8 is a sequence diagram illustrating an example of a flow of an ANR process which is performed by being triggered by detection of the presence of the other eNB using one eNB.

Next, the ANR process which is performed by being triggered by detection of the presence of another eNB, that is, the eNB 100e that contains the cell 150 (PCI=5) using the eNB 100b that contains the cell 150 (PCI=100 (b)) will be described with reference to FIG. 8 and FIG. 9. FIG. 8 is a sequence diagram illustrating an example of a flow of the ANR process which is performed by being triggered by detection of the presence of the eNB 100e using the eNB 100b. FIG. 9 is a data structure diagram illustrating an example of cell information which is exchanged between the eNBs 100 by the ANR process which is performed by being triggered by detection of the presence of the eNB 100e using the eNB 100b.

As illustrated in the example in FIG. 8, the ANR process which is performed by being triggered by detection of the presence of another eNB, that is, the eNB 100e using the eNB 100b is performed in the same manner as the ANR process which is illustrated in FIG. 6 and is performed by being triggered by detection of the presence of another eNB, that is, the eNB 100a using the eNB 100e. That is, the ECGI and the IP address of the eNB 100e are acquired in order using the eNB 100b and the X2 interface is established between the eNB 100b and the eNB 100e. In addition, the eNB 100b notifies other eNBs, that is, the eNBs 100c and 100d that neighbor the eNB 100b of the cell information illustrated in FIG. 9. Specifically, as illustrated in the example in FIG. 9, the eNB 100b notifies the eNBs 100c and 100d of cell information indicating the cell 150 (PCI=100 (b) & ECGI=300), the cell 150 (PCI=103 & ECGI= . . . ) and the cell 150 (PCI=104 & ECGI= . . . ) that the eNB 100b contains, and the cell information of each cell that neighbors each cell that the eNB 100b contains.

The eNB 100b acquires cell information from the eNB 100e when the X2 interface is established between the eNB 100b and the eNB 100e. As a result, the eNB 100b recognizes the presence of the cell 150 (PCI=100 (a) & ECGI=200) that neighbors the eNB 100e. In addition, the eNB 100b also recognizes the presence of the cell 150 (PCI=100 (b)) & ECGI=300) that the eNB 100b contains. Therefore, the eNB 100b recognizes the presence of a plurality of cells 150 having different ECGIs and the same PCIs. That is, the eNB 100b detects collision of the PCIs. However, in the first process example, it is preferable for the eNB 100b not to perform the PCI changing process at this stage as illustrated in FIG. 5. In the first process example, the process of changing the PCI of the cell 150 (PCI=100 (a)) or the cell 150 (PCI=100 (b)) the PCIs of which collide with each other is performed under the control of the eNB 100e that neighbors both the eNB 100a that contains the cell 150 (PCI=100 (a)) and the eNB 100b that contains the cell 150 (PCI=100 (b)) the PCIs of which collide with each other as will be described later.

Specifically, as illustrated in the example in FIG. 5, the call processing control function unit 124 included in the eNB 100e judges whether collision of the PCIs occurs with reference to the cell information sent from another neighboring eNB 100. In addition, the call processing control function unit 124 included in the eNB 100e determines one cell 150 the PCI of which is to be changed in two cells 150 the PCIs of which collide with each other with reference to the cell information sent from another neighboring eNB 100.

Figure 10:
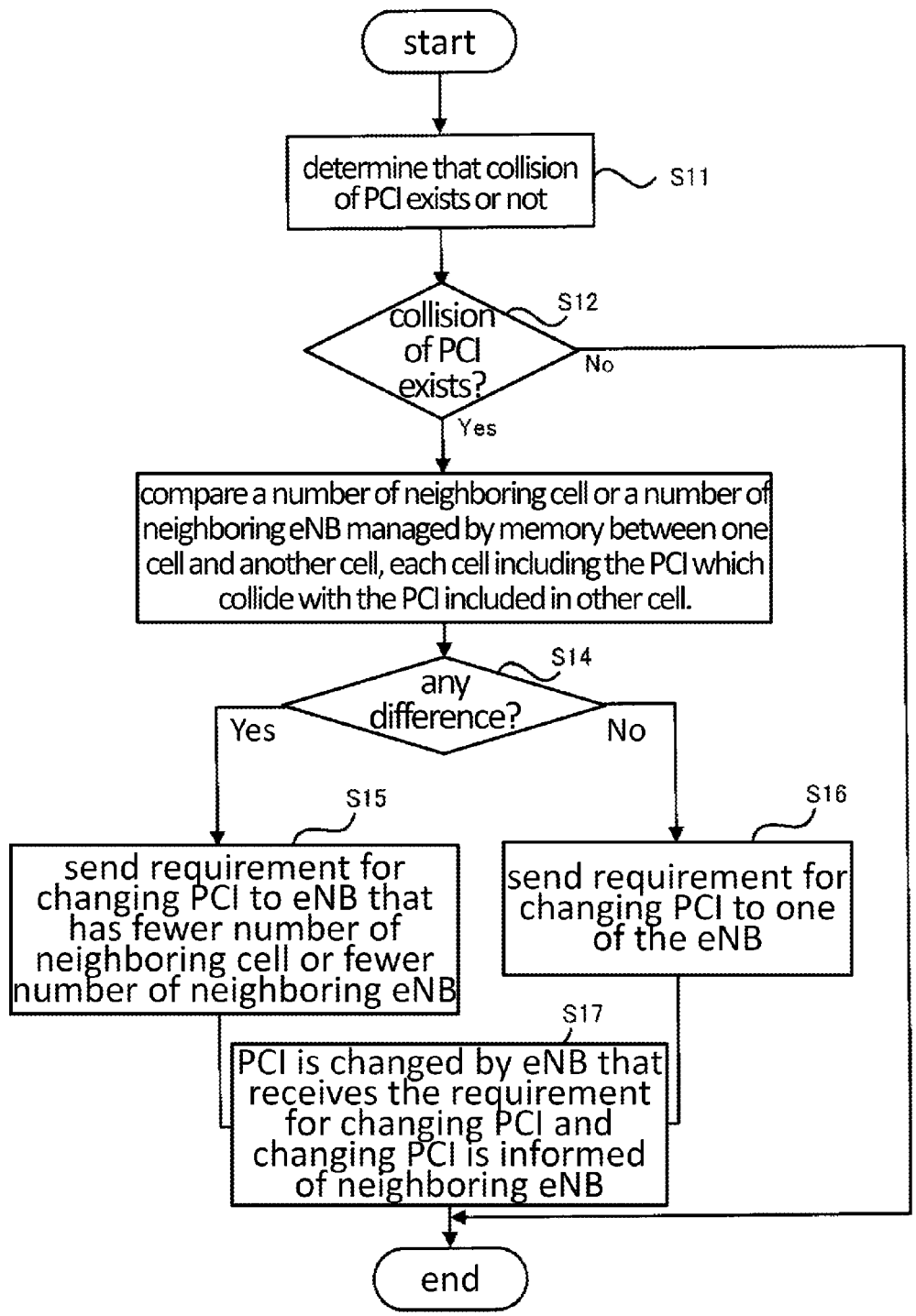
FIG. 10 is a flowchart illustrating an example of a flow of a process of judging whether collision of PDIs occurs and a process of deciding one cell the PCI of which is to be changed.

Next, a process of judging whether collision of PCIs occurs and a process of determining one cell 150 the PCI of which is to be changed will be described with reference to FIG. 10. FIG. 10 is a flowchart illustrating an example of a flow of the process of judging whether collision of the PCIs occurs and the process of determining one cell 150 the PCI of which is to be changed.

As illustrated in the example in FIG. 10, the call processing control function unit 124 included in the eNB 100e judges whether collision of PCIs occurs with reference to the cell information sent from another neighboring eNB 100 (step S11). In other words, the call processing control function unit 124 included in the eNB 100e judges whether identification (distinction) of the PCIs is allowed between the eNB 100e and another neighboring eNB 100 with reference to the cell information sent from another neighboring 100 (step S11). For example, the eNB 100e has the cell information (see FIG. 7) of its own. In addition, the eNB 100e acquires the cell information (see FIG. 9) of each of the eNBs 100a and 100b when the X2 interface is established between it and each of the eNBs 100a and 100b. Therefore, the call processing control function unit 124 included in the eNB 100e recognizes that both the cell 150 (PCI=100 (a)) & ECGI=200) and the cell 150 (PCI=100 (b) & ECGI=300) neighbor the eNB 100e with reference to the cell information of both the eNBs 100a and 100b. Therefore, the call processing control function unit 124 included in the eNB 100e is allowed to recognize the presence of a plurality of cells 150 having different ECGIs and the same PCIs. That is, the call processing control function unit 124 included in the eNB 100e is allowed to detect collision of the PCIs (the fact that identification (distinction) of the PCIs is not allowed).

In the case that collision of the PCIs does not occur (or identification of the PCIs is allowed) (step S12: No), the eNB 100e does not perform the PCI changing process.

On the other hand, in the case that collision of the PCIs occurs (or identification of the PCIs is not allowed) (step S12: Yes), the eNB 100e performs the PCI changing process. Specifically, the call processing control function unit 124 included in the eNB 100e compares with each other the numbers of the neighboring cells 150 or neighboring eNBs 100 of two cells 150 the PCIs of which collide with each other with reference to the cell information of each of the eNBs 100a and 100b (step S13).

Incidentally, as an opportunity to perform the process of detecting collision of the PCIs (step S12), an opportunity to change cell information with updating the PCI of an existing eNB 100 (or an existing cell 150) may be included in addition to an opportunity to change cell information with adding a new eNB 100 (or a new cell 150). In addition, in the case that collision of the PCIs is detected, an opportunity to perform a process of detecting collision of other PCIs which would occur while a later described PCI updating process which would be performed in accordance with a result of the above mentioned detection is being performed in order to avoid collision of the PCIs may be reserved or may not be reserved.

In the case that there is a difference in the number of neighboring cells or neighboring eNBs 100 between these two cells 150 (step S14: Yes) as a result of comparison, the call processing control function unit 124 included in the eNB 100*e* sends one eNB 100 that contains the cell 150 which is smaller in the number of neighboring cells 150 or neighboring eNBs 100 a PCI change instruction or request (step S15). On the other hand, the call processing control function unit 124 included in the eNB 100*e* does not send the other eNB 100 that contains the cell 150 which is larger in the number of neighboring cells 150 or neighboring eNBs 100 the PCI change instruction or request. As a result, the eNB 100 that has received the PCI change instruction or request determines a change value of the PCI of the cell 150 the PCI of which collides with that of the cell concerned, in the cells 150 that it contains, and changes the PCI. On the other hand, it may be preferable for the eNB 100 that has not received the PCI change instruction or request not to change the PCI of the cell 150 that it contains. More specifically, for example, in the example illustrated in FIG. 4, the number of cells 150 that neighbor the cell 150 (PCI=100 (a)) is four and the number of cells 150 that neighbor the cell (PCI=100 (b)) is five. Accordingly, in the example illustrated in FIG. 4, the PCI change instruction or request (specifically, an "X2 eNB Configuration Update Request (PCI=100 (a)" message illustrated in FIG. 5) is sent to the eNB 100*a* that contains the cell 150 (PCI=100 (a)). As a result, the PCI of the cell 150 (PCI=100 (a)) is changed under the control of the CPU 128 included in the eNB 100*a*. On the other hand, in the example illustrated in FIG. 4, the PCI change instruction or request is not sent to the eNB 100*b* that contains the cell 150 (PCI=100 (b)). As a result, the eNB 100*b* does not change the PCI of the cell 150 (PCI=100 (b)).

On the other hand, in the case that there is no difference in the number of neighboring cells 150 or neighboring eNBs 100 between these two cells 150 (step S14: No), the call processing control function unit 124 included in the eNB 100*e* sends the eNB 100 that contains either one cell 150 which is selected from these two cells 150 the PCIs of which collide with each other in accordance with a predetermined standard the PCI change instruction or request (step S16). On the other hand, the call processing control function unit 124 included in the eNB 100*e* does not send the eNB 100 that contains either other cell 150 which is not selected from these two cells 150 the PCIs of which collide with each other in accordance with the predetermined standard the PCI change instruction or request.

Then, the call processing control function unit 124 included in the eNB 100 that has changed the PCI of its own cell or its neighboring cell notifies another neighboring eNB 100 of cell information reflecting the change of the PCI (step S17). Specifically, in the case that the eNB 100*a* has changed the PCI, the call processing control function unit 124 included in the eNB 100*a* sends another neighboring eNB, that is, the eNB 100*e* an "eNB Configuration Update (notice PCI modification)" message in order to notify it of the cell information reflecting the change of the PCI. The eNB 100*e* that has received the "eNB Configuration Update (notice PCI modification)" message sends an "eNB Configuration Update acknowledge" message back to the eNB 100*a*. In addition, the call processing control function unit 124 included in the eNB 100*a* sends other eNBs, that is, the eNBs 100*b* and 100*c* that neighbor the eNB 100*a* the "eNB Configuration Update (notice PCI modification)" message in order to notify them of the cell information reflecting the change of the PCI in the eNB 100*a*. Each of the eNBs 100*b* and 100*c* that has received the "eNB Configuration Update (notice PCI modification)" message sends the "eNB Configuration Update acknowledge" message back to the eNB 100*a*.

As described above, according to the first process example, in the case that PCIs collide with each other in two cells 150 that two eNBs 100 contain, one eNB 100 that contains one cell 150 which is smaller in the number of neighboring cells 150 in these two eNBs 100 changes its PCI. That is, according to the first process example, the PCI of one eNB 100 which is smaller in processing load imposed on changing of its PCI is changed. Thus, it may not be requested for both of these two eNBs 100 the PCIs of which collide with each other to individually change their PCIs. Or, it may not be requested to change the PCI of the other eNB 100 which is larger in processing load imposed on changing of its PCI in these two eNBs 100. As a result, even when collision of PCIs occurs, it is allowed to appropriately determine a new PCI that the eNB 100 concerned uses.

According to the first process example, performance of the PCI changing process is instructed centrically from one eNB 100 that contains a cell 150 that neighbors both of these two cells 150 the PCIs of which collide with each other. That is, it may not be requested for these two eNBs 100 the PCIs of which collide with each other to determine whether the PCI changing process is to be performed. Accordingly, it may become possible to appropriately change (that is, determine) the PCI in comparison with a case in which both of two eNBs 100 the PCIs of which collide with each other individually (in other words, selfishly) change their PCIs.

Incidentally, the first-process-example-based PCI changing process (the (process which is prepared on the basis of the first process example) illustrated in FIG. 10 may be typically performed. Or, PCI changing may be carried out while appropriately switching from the first-process-example-based PCI changing process illustrated in FIG. 10 to an existing PCI processing process or vice versa. In the case that PCI changing is carried out while appropriately switching from the first-process-example-based PCI changing process to an existing PCI processing process or vice versa, an SON performance validity flag for determining whether the first-process-example-based PCI changing process is to be performed may be stored in a memory 129 included in the eNB 100 concerned. For example, when the SON performance validity flag indicates "0 (OFF: invalid)", the existing PCI changing process may be performed and when the SON performance validity flag indicates "1 (ON: valid)", the first-process-example-based PCI changing process may be performed. As a result, it may become possible for both telecommunications carriers who may not want the first-process-example-based PCI changing process and telecommunication carriers who may want the first-process-example-based PCI changing process to introduce the eNBs 100 of the same specification. As a result, the cost involved in change of the specification of the eNBs 100 may be favorably reduced.

(4) Second Process Example

Figure 11A:
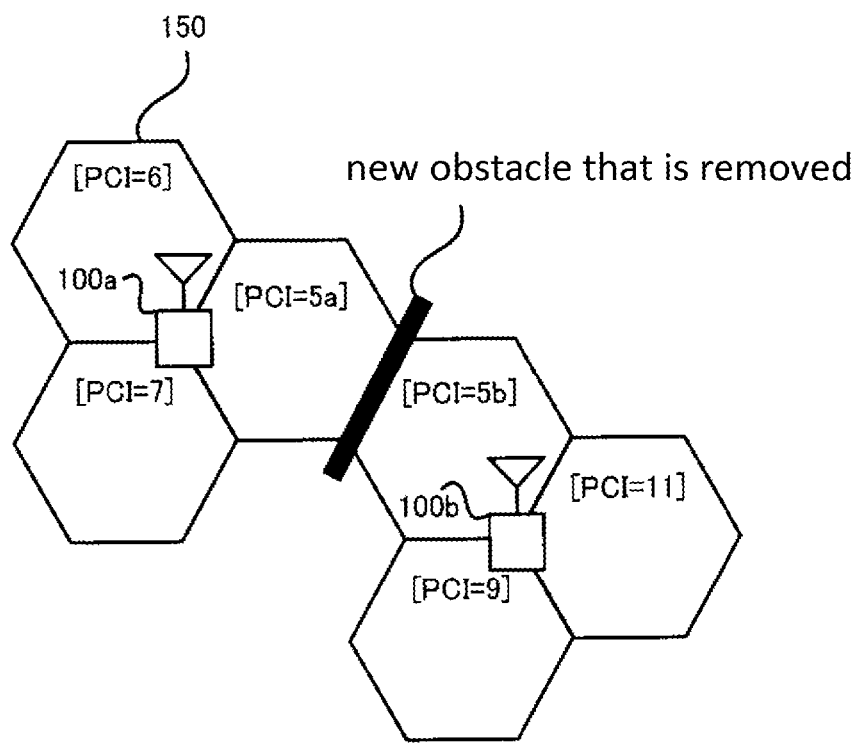
FIG. 11A and FIG. 11B are diagrams illustrating examples of states of cells when one eNB performs a second process example.
Figure 11B:
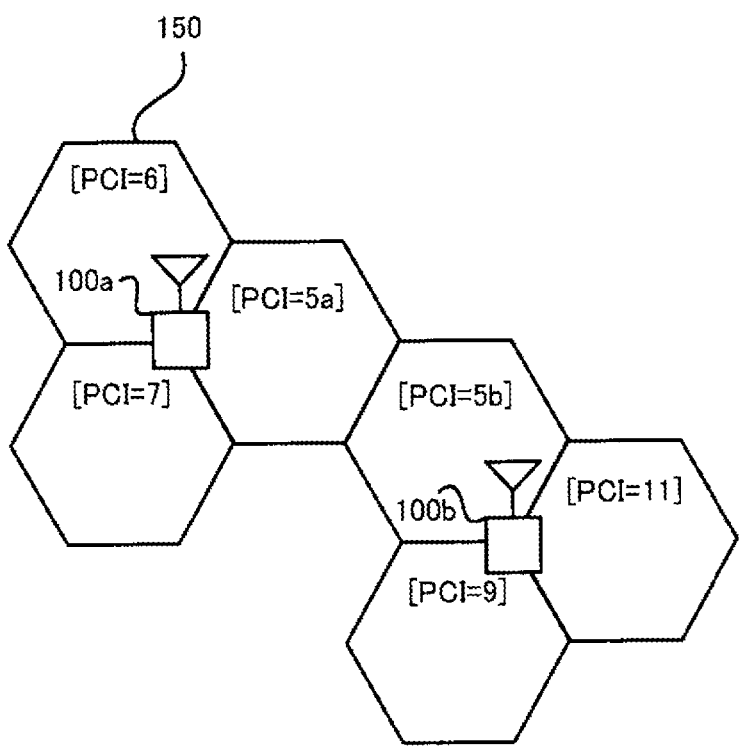

Next, a second process example of the eNB 100 will be described with reference to FIG. 11A, FIG. 11B and FIG. 12. FIG. 11A and FIG. 11B are diagrams illustrating examples of states of cells 150 when one eNB 100 performs the second process example. FIG. 12 is a sequence diagram illustrating an example of a flow of the second process example performed using the eNB 100.

As illustrated in the examples in FIG. 11A and FIG. 11B, the second process example is a process which is to be performed when although two eNBs 100 (or two existing cells 150) have not been in a mutually neighboring relation so far owing to the presence of an obstacle (a shield) such as, for example, a building or the like between them, these two existing eNBs 100 are newly brought into the mutually neighboring relation by removing the obstacle between them. In the following, the second process example will be described with reference to a specific example that although two existing eNBs, that is, the eNBs 100a and 100b (or two existing cells, that is, the cells 150 (PCI=5 (a) and (PCI=5 (b)) have not been in a mutually neighboring relation so far owing to the presence of an obstacle (a shield) such as, for example, a building or the like between them, these two existing eNBs 100a and 100b are newly brought into the mutually neighboring relation by removing the obstacle between them as illustrated in the examples in FIG. 11A and FIG. 11B. Incidentally, the eNB 100a contains a cell 150 (PCI=6) and a cell 150 (PCI=7) in addition to a cell 150 (PCI=5(a)) and the eNB 100b contains a cell 150 (PCI=9) and a cell 150 (PCI=11) in addition to a cell 150 (PCI=5(b)).

In the following, an example of a case in which the eNB 100a illustrated in FIG. 11A and FIG. 11B detects collision of PCIs will be described. As illustrated in the example in FIG. 12, the call processing control function unit 124 included in the eNB 100a judges whether collision of PCIs occurs. In addition, the call processing control function unit 124 included in the eNB 100a acquires the ECGI of the opposing eNB 100b the PCI of which collides with that of the eNB 100a.

Figure 13:
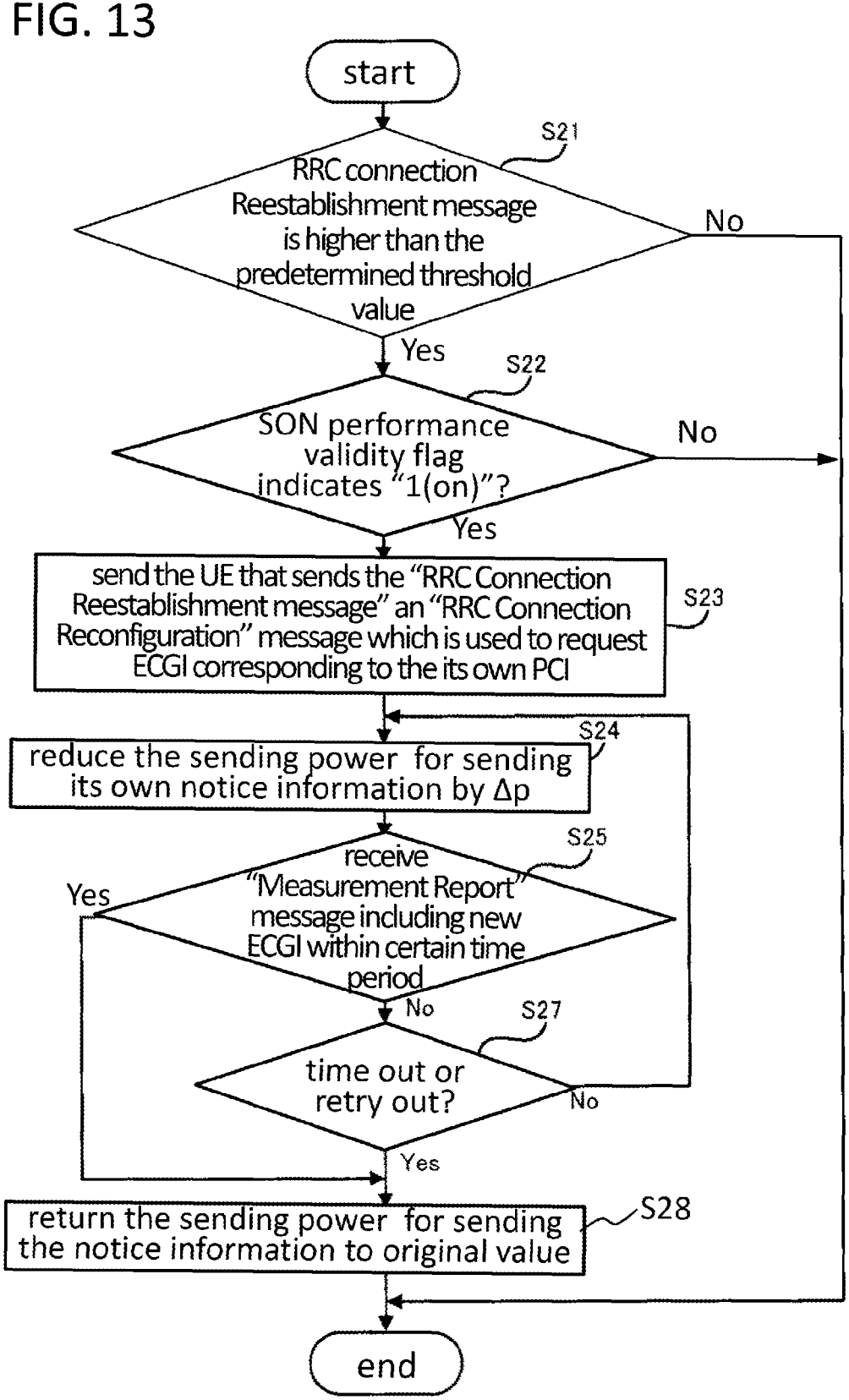
FIG. 13 is a flowchart illustrating an example of a flow of a process of judging whether collision of PCIs occurs and an ECGI acquiring process in the second process example.

Next, a process of judging whether collision of PCIs occurs and an ECGI acquiring process in the second process example will be described with reference to FIG. 13. FIG. 13 is a flowchart illustrating an example of a flow of the process of judging whether collision of PCIs occurs and the ECGI acquiring process in the second process example.

As illustrated in the example in FIG. 13, in the second process example, the call processing control function unit 124 included in the eNB 100a judges whether the frequency of receiving an "RRC Connection Reestablishment" message which is sent from the UE 300 and to which an "RRC Correction Reestablishment Reject" message is sent back is higher than a predetermined threshold value (step S21). The call processing control function unit 124 included in the eNB 100a detects whether collision of PCIs occurs on the basis of a result of judgment of the "RRC Connection Reestablishment" message receiving frequency (step S21). Incidentally, whether collision of PCIs occurs may be detected by using other cases which would occur when collision of PCIs occurs or indexes which would vary when collision of PCIs occurs.

In the case that it is judged that collision of PCIs does not occur (in other words, the frequency of receiving the "RRC Connection Reestablishment" message is not higher than the predetermined threshold value) (step S21: No), the eNB 100a does not perform the PCI changing process.

On the other hand, in the case that it is judged that collision of PCIs occurs (in other words, the frequency of receiving the "RRC Connection Reestablishment" message is higher than the predetermined threshold value) (step S21: Yes), the call processing control function unit 124 included in the eNB 100a judges whether the SON performance validity flag for determining whether the second-process-example-based PCI changing process is to be performed indicates "1 (ON)" (step S22). That is, the call processing control function unit 124 included in the eNB 100a judges whether the second-process-example-based PCI changing process is to be performed.

In the case that it is judged that the SON performance validity flag does not indicate "1 (ON)" (step S22: No), the eNB 100a does not perform the later described second-process-example-based PCI changing process.

On the other hand, in the case that it is judged that the SON performance validity flag indicates "1 (ON)" (step S22: Yes), the call processing control function unit 124 included in the eNB 100a sends the UE 300 that sends the "RRC Connection Reestablishment" message an "RRC Connection Reconfiguration" message which is used to request to acquire the ECGI corresponding to the PCI (=5) that collides with that of the eNB 100a (step S23). The UE 300 that has received the "RRC Connection Reconfiguration" message acquires the ECGI of the cell 150 the PCI of which is 5 (PCI=5). The UE 300 that has acquired the ECGI sends the eNB 100a a "Measurement Report" message including the acquired ECGI.

In the second process example, it is preferable to make the UE 300 acquire the ECGI of the cell 150 (PCI=5 (b)) that the mating eNB 100b with which the eNB 100a is in a PCI collision relation contains, instead of the ECGI of the cell 150 (PCI=5 (a)) that the eNB 100a contains so as to allow the eNB 100a to recognize the cell 150 (PCI=5 (b)) that the eNB 100b contains. Therefore, the call processing control function unit 124 included in the eNB 100a reduces the sending power which is used to send its own notice information by a predetermined value Δ (step S24). As a result, it may become easier for the UE 300 to acquire the notice information sent from the eNB 100b than to acquire the notice information sent from the eNB 100a.

Then, the call processing control function unit 124 included in the eNB 100a judges whether a "Measurement Report" message including a new ECGI is sent from the UE 300 within a predetermined time period (step S25). That is, the call processing control function unit included in the eNB 100a judges whether the Measurement Report" message including the ECGI of the cell 150 (PCI=5 (b)) that the eNB 100b contains and the PCI of which collides with that of the eNB 100a is sent from the UE 300 (step S25).

In the case that it is judged that the "Measurement Report" message including the new ECGI is sent from the UE 300 within the predetermined time period (step S25: Yes), the call processing control function unit 124 included in the eNB 100a returns its sending power used to send the notice information to its original value (step S28).

On the other hand, in the case that it is judged that the "Measurement Report" message including the new ECGI is not sent from the UE 300 within the predetermined time period (step S25: No), the call processing control function unit 124 included in the eNB 100a performs again the process of reducing its sending power used to send the notice information by the predetermined value Δ. The sending power reducing process is repetitively performed until the Measurement Report" message including the new ECGI is sent from the UE 300, that is, until time is out or retry is out (step S27).

Again in the example in FIG. 12, the call processing control function unit 124 included in the eNB 100a that has acquired the ECGI of the cell 150 (PCI=5 (b)) that the eNB 100b contains acquires the IP address of the eNB 100b by using the acquired ECGI. The IP address acquiring operation is performed by sending and receiving the messages which are the same as those used in the ANR process illustrated in FIG. 6 and FIG. 8. That is, the IP address acquiring operation is performed by sending the "eNB Configuration Transfer (report IP address of eNB100b) message from the eNB 100a to the MME 500, sending the "MME Configuration Transfer" message from the MME 500 to the eNB 100b, sending the "eNB Configuration Transfer" message from the eNB 100b to the MME 500, and sending the "MME Configuration Transfer (report IP address of eNB100b)" message from the MME 500 to the eNB 100a.

Then, the X2 interface is established between two eNBs, that is, the eNBs 100a and 100b the PCIs of which collide with each other by sending and receiving the same messages (that is, the "X2 Setup Request" message and the "X2 Setup Response" message) as those used in the ANR process illustrated in FIG. 6 and FIG. 8.

Then, one of these two eNBs 100a and 100b the PCIs of which collide with each other changes the PCI of the cell 150 that it contains. For example, as in the first process example, the call processing control function unit 124 included in the eNB 100a may send the eNB 100 that contains one cell 150 which is smaller in the number of neighboring cells 150 or neighboring eNBs 100 in two cells 150 the PCIs of which collide with each other the PCI change instruction or request. As an alternative, the call processing control function unit 124 included in the eNB 100a may send one eNB 100 that contains either one cell 150 which is selected from these two cells 150 the PCIs of which collide with each other in accordance with a predetermined standard the PCI change instruction or request. More specifically, for example, in the example illustrated in FIG. 11A and FIG. 11B, the number of cells 150 that neighbor the cell 150 (PCI=5(a)) is three and the number of cells 150 that neighbor the cell (PCI=5 (b)) is also three. Therefore, in the example illustrated in FIG. 11A and FIG. 11B, the eNB 100a that contains the cell 150 (PCI=5(a)) may change the PCI of the cell 150 (PCI=5 (a)). In the above mentioned case, it is preferable for the eNB 100b that contains another cell 150, that is, the cell 150 (PCI=5 (b)) the PCI of which collides with the PCI of the eNB 100a not to change the PCI of the cell 150 (PCI=5 (b)). As an alternative, in the example illustrated in FIG. 11A and FIG. 11B, the eNB 100b that contains the cell 150 (PCI=5 (b)) may change the PCI of the cell 150 (PCI=5(a)). In the above mentioned case, it is preferable for the eNB 100a that contains the other cell 150, that is, the cell 150 (PCI=5 (a)) the PCI of which collides with the PCI of the eNB 100b to send the eNB 100b the PCI change instruction or request and not to change the PCI of the cell 150 (PCI=5 (a)).

As described above, according to the second process example, as in the first process example, in the case that PCIs collide with each other in two cells 150 that two eNBs 100 contain, one eNB 100 that contains the smaller number of neighboring cells 150 in these two eNBs 100 changes its PCI. Thus, it may not be requested for both of these two eNBs the PCIs of which collide with each other to change their PCIs. Or, it may not be requested to change the PCI of the other eNB 100 which is larger in processing load imposed on changing of its PCI in these two eNBs 100. As a result, even when collision of PCIs occurs, it is allowed to appropriately determine a new PCI that the eNB 100 concerned uses.

According to the second process example, performance of the PCI changing process is centrically instructed from one eNB 100 that contains either one of two cells 150 the PCIs of which collide with each other. That is, it may not be requested for both of these two eNBs 100 the PCIs of which collide with each other to determine themselves whether the PCI changing process is to be performed. Accordingly, it may become possible to appropriately change (that is, determine) the PCI in comparison with a case in which both of two eNBs 100 the PCIs of which collide with each other individually (in other words, selfishly) change their PCIs.

According to the second process example, one eNB 100 that contains either one of two cells 150 the PCIs of which collide with each other reduces its sending power used for sending its own notice information in order to acquire the ECGI of either other of these two cells 150 the PCIs of which collide with each other. As a result, it may become easier for the EU 300 to receive the notice information from the other eNB 100 that contains either other of these two cells 150 the PCIs of which collide with each other than to receive the notice information of one eNB 100 that contains either one of these two cells 150 the PCIs of which collide with each other. Therefore, it may become possible for one eNB 100 that contains either one of these two cells 150 the PCIs of which collides with each other to favorably acquire the ECGI of either other of these two cells 150 the PCIs of which collide with each other. As a result, it may become possible for one eNB 100 that contains either one of these two cells 150 the PCIs of which collide with each other to favorably establish the X2 interface between it and the other eNB 100 that contains either other of these two cells 150 the PCIs of which collide with each other and to appropriately perform the later PCI changing process.

In the explanation of the first and second process examples, an example in which in the case that the PCIs collide with each other between two cells 150 that two eNBs 100 respectively contain, one of these two eNBs 100 that contains one cell 150 which is smaller in the number of neighboring cells 150 changes its PCI is described. However, even when PCIs collide with one another among two or more cells 150 that two or more eNBs 100 contain, the above mentioned PCI changing process may be performed. For example, in two or more eNBs 100, one eNB 100 that contains a cell 150 which is relatively lower or the lowest in the number of neighboring cells 150 may change its PCI. In other words, in two or more eNBs 100, another eNB 100 that contains a cell 150 which is relatively large or the largest in the number of neighboring cells 150 is allowed not to change its PCI. Even in the above mentioned case, a new PCI that the eNB 100 uses may be appropriately determined.

The present invention is not limited to the above embodiments and may be appropriately altered and modified within a range not departing from the gist or concept of the invention which may be read out of the entire of the appended claims and specification, and a cell identifier deciding method, a radio base station and a radio communication system so altered and modified may be also included in the technical range of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:
1. A cell identifier deciding method comprising:
   judging whether cell identifiers allocated to cells contained by a plurality of radio base stations conflict among the plurality of radio base stations;
   when judged that cell identifiers contained by the plurality of radio base stations do conflict, changing a conflicting cell identifier of a radio base station based upon conditions imposed on changing of cell identifiers in the plurality of radio base stations;
   reducing the sending power used to send notice information from the radio base station when it is judged that a conflict exits;
   receiving the notice information sent from another radio base station in the plurality of radio base stations using the mobile terminal;

sending the radio base station the notice information that the mobile terminal has received;
specifying the plurality of radio base stations which are judged as having cell identifiers on the basis of the notice information sent from the mobile terminal; and
establishing a communication connection among the plurality of specified radio base stations, wherein
the judging by judging that a conflict exists when a request for re-connection of a cell having the same cell identifier is made from a mobile terminal to a radio base station a predetermined number of times or more; and wherein
the changing is performed by:
sending an instruction signal to instruct not to change the cell identifier is sent to the other radio base station and the changed cell identifier to the other radio base station via the established communication connection, in the case that the above one radio base station changes the cell identifier,
while, sending an instruction signal for instructing to change the cell identifier to the other radio base station via the established communication connection, in the case that the above one radio base station does not change the cell identifier.

2. The cell identifier deciding method according to claim 1, wherein
the judging whether the cell identifiers allocated to cells contained by a plurality of radio base stations conflict is performed by judging whether the cell identifiers collide with one another among the plurality of radio base stations, and
the changing changes a conflicting cell identifier of a radio base station among the conflicting cell identifiers based on a lower processing load imposed by the changing of its cell identifier among the plurality of radio base stations.

3. The cell identifier deciding method according to claim 2 wherein
the changing of the conflicting cell identifier is instructed by one of the plurality of radio base stations.

4. The cell identifier deciding method according to claim 1, wherein
the changing of the conflicting cell identifier is instructed by using another radio base station that contains a cell that neighbors the respective conflicting cells that the plurality of radio base stations contain.

5. The cell identifier deciding method according to claim 4, wherein
the judging is performed by the other radio base station judging whether cell identifiers conflict among the plurality of radio base stations on the basis of neighbor information which is sent from the plurality of radio base stations to the other radio base station and which indicates the cell of the other radio base station that neighbors the respective cells that the plurality of radio base stations contain.

6. The cell identifier deciding method according to claim 1, wherein the changing the cell identifier is performed by changing by the conflicting cell identifier of a radio base station which is relatively low in the number of neighboring cells or the number of neighboring radio base stations in the plurality of radio base stations.

7. A radio base station comprising:
judging unit that judges whether cell identifiers allocated to cells contained by a plurality of radio base stations conflict among the plurality of radio base stations;
a changing unit that, when judged cell identifiers conflict, changes a conflicting cell identifier of a radio base station based upon conditions imposed by changing of cell identifiers in the plurality of radio base stations;
a control unit that reduces the sending power used to send notice information from the radio base station when it is judged that a conflict exits, and specifies the plurality of radio base stations which are judged as having cell identifiers on the basis of the notice information sent from the mobile terminal;
a transceiver unit that receives the notice information sent from another radio base station in the plurality of radio base stations using the mobile terminal, and sends the radio base station the notice information that the mobile terminal has received; and
an interface unit that establishes a communication connection among the plurality of specified radio base stations; wherein
the judging by judging that a conflict exists when a request for re-connection of a cell having the same cell identifier is made from a mobile terminal to a radio base station a predetermined number of times or more; and wherein
the changing is performed by:
sending an instruction signal to instruct not to change the cell identifier is sent to the other radio base station and the changed cell identifier to the other radio base station via the established communication connection, in the case that the above one radio base station changes the cell identifier,
while, sending an instruction signal for instructing to change the cell identifier to the other radio base station via the established communication connection, in the case that the above one radio base station does not change the cell identifier.

8. A radio communication system including a plurality of radio base stations, the radio communication system comprising:
a judging unit that judges whether cell identifiers allocated to cells contained by a plurality of radio base stations conflict among the plurality of radio base stations;
a changing unit that, when judged cell identifiers conflict, changes a conflicting cell identifier of a radio base station based upon conditions imposed by changing of cell identifiers in the plurality of radio base stations;
a control unit that reduces the sending power used to send notice information from the radio base station when it is judged that a conflict exits, and specifies the plurality of radio base stations which are judqed as having cell identifiers on the basis of the notice information sent from the mobile terminal;
a transceiver unit that receives the notice information sent from another radio base station in the plurality of radio base stations using the mobile terminal, and sends the radio base station the notice information that the mobile terminal has received; and
an interface unit that establishes a communication connection among the plurality of specified radio base stations; wherein
the judging by judging that a conflict exists when a request for re-connection of a cell having the same cell identifier is made from a mobile terminal to a radio base station a predetermined number of times or more; and wherein
the changing is performed by:
sending an instruction signal to instruct not to change the cell identifier is sent to the other radio base station and the changed cell identifier to the other radio base station via the established communication connection, in the case that the above one radio base station changes the cell identifier, while, sending an instruction signal for instructing to change the cell identifier to the other radio base station via the established communication connection, in the case that the above one radio base station does not change the cell identifier.

9. The radio communication system according to claim 8, wherein the changing the cell identifier is performed by changing the conflicting cell identifier of a radio base station which is relatively low in the number of neighboring cells or the number of neighboring radio base stations in the plurality of radio base stations, as compared to other conflicting cells' radio base stations.

* * * * *